(12) United States Patent
Skaanning et al.

(10) Patent No.: US 6,820,072 B1
(45) Date of Patent: Nov. 16, 2004

(54) VALIDATION OF PROBABILISTIC TROUBLESHOOTERS AND DIAGNOSTIC SYSTEM

(75) Inventors: Claus Skaanning, Dronninglund (DK); Henri Jacques Suermondt, Mountain View, CA (US); Finn Verner Jensen, Brønderslev (DK)

(73) Assignee: Hewlett-Packard Development Company, L.P., Houston, TX (US)

( * ) Notice: Subject to any disclaimer, the term of this patent is extended or adjusted under 35 U.S.C. 154(b) by 844 days.

(21) Appl. No.: 09/644,117

(22) Filed: Aug. 22, 2000

(51) Int. Cl.[7] .............................................. G06F 15/18

(52) U.S. Cl. ......................................... 706/52; 706/60

(58) Field of Search ................................... 706/52, 60

(56) References Cited

U.S. PATENT DOCUMENTS

| | | | | |
|---|---|---|---|---|
| 4,866,635 A | * | 9/1989 | Kahn et al. ................. | 706/46 |
| 5,133,046 A | * | 7/1992 | Kaplan ....................... | 706/52 |
| 5,493,729 A | * | 2/1996 | Nigawara et al. ............ | 706/52 |
| 5,522,014 A | * | 5/1996 | Clark et al. .................. | 706/45 |
| 5,537,644 A | * | 7/1996 | Hamilton et al. ............ | 706/52 |
| 5,604,841 A | * | 2/1997 | Hamilton et al. ............ | 706/11 |
| 5,696,884 A | * | 12/1997 | Heckerman et al. ......... | 706/61 |
| 6,012,152 A | * | 1/2000 | Douik et al. ................. | 714/26 |
| 6,076,083 A | * | 6/2000 | Baker .......................... | 706/52 |
| 6,456,622 B1 | * | 9/2002 | Skaanning et al. ......... | 370/389 |
| 6,529,893 B1 | * | 3/2003 | Foner et al. ................. | 706/60 |
| 6,535,865 B1 | * | 3/2003 | Skaaning et al. ............ | 706/52 |

OTHER PUBLICATIONS

Causal independence for probability assessment and inference using Bayesian networks Heckerman, D.; Breese, J.S.;☐☐Systems, Man and Cybernetics, Part A, IEEE Transactions on , vol.: 26, Issue: 6, Nov. 1996 pp.: 826–831.*

Probabilistic relevance relations Geiger, D.; Heckerman, D.; Systems, Man and Cybernetics, Part A, IEEE Transactions on, vol.: 28 , Issue: 1 , Jan. 1998 pp.:17–25.*

Decision–theoretic case–based reasoning Breese, JS.; Heckerman, D.; Systems, Man and Cybernetics, Part A, IEEE Transactions on , vol.:26 , Issue: 6 , Nov. 1996 pp.:838–842.*

Sensitivity analysis for probability assessments in Bayesian networks, Laskey, K.B.; Systems, Man and Cybernetics, IEEE Transactions on, vol.: 25 Issue: 6, Jun. 1995, pp.: 901–909.*

Decision–theoretic case–based reasoning, Breese, J.S.; Heckerman, D.; Systems, Man and Cybernetics, Part A, IEEE Transactions on, vol.: 26 Issue: 6, Nov. 1996, pp: 838–842.*

(List continued on next page.)

Primary Examiner—Ramesh Patel
Assistant Examiner—Michael B. Holmes (57) ABSTRACT

A probabilistic diagnostic system is validated. A diagnostic sequence is generated from a diagnostic model. The diagnostic sequence is evaluated to determine whether the diagnostic sequence provides an acceptable resolution to a problem. This is repeated for additional diagnostic sequences from the diagnostic model. It is determined whether a predetermined number of diagnostic sequences provide an acceptable resolution. When it is determined that the predetermined number of diagnostic sequences provide an acceptable resolution, the diagnostic model is accepted.

38 Claims, 7 Drawing Sheets

OTHER PUBLICATIONS

Distributed data mining of probabilistic knowledge, Lam, W.; Segre, A.M.; Distributed Computing Systems, 1997., Proceedings of the 17.sup.th International Conference on, 1997, pp.: 178–185.*

Bayesian network refinement via machine learning approach, Wai Lam; Pattern Analysis and Machine Intelligence, IEEE Transactions on, vol.: 20 Issue: 3, Mar. 1998, pp.: 240–251.*

Breese J.S., et al., "Decision–Theoretic Case–Based Reasoning" IEEE Transactions on Systems, Man & Cybernetics, Part A: Systems & Humans, US, IEEE Service Center, vol. 26, No. 6, Nov. 1, 1996, pp. 838–842.*

A. Mishra, et al., "Bayesian Belief Networks 1,6 for Effective Troubleshooting", Proceedings of International Conference on Neural Networks, vol. 5, Jul. 10, 1999, pp 3425–3429.*

H. Kirsch, et al., "Applying Bayesian Networks to Fault Diagnosis", Proceedings of the IEEE International Conference on Control & Applications, vol. 2, Aug. 24, 1994, pp. 895–900.*

J. Lauber, et al., "Autonomoys Agents For Online Diagnosis of a Safety Critical System Based on Probabilistic Casual Reasoning", Proceedings of ISADS 99. Fourth International Symposium on Autonomous Decentralized Systems, Mar. 21, 1999, pp. 213–219.*

Breese, J.S. and Heckerman, D. "Decision–theoretic Troubleshooting: A Framework for Repair and Experiment", Technical Report MSR–TR–96–06, Microsoft Research, Advanced Technology Division, Microsoft Corporation, Redmond, USA (1996).*

Heckerman, D., Breese, J., and Rommelse, K., "Decision–theoretic Troubleshooting," in Communications of the ACM, 38:49–57 (1995).*

Lauritzen, S.L., and Spiegelhalter, D.J., "Local Computations with Probabilities on Graphical Structures and their Applications to Expert Systems," Journal of the Royal Statistical Society, Series B, 50(2): 157–224 (1988).*

Jensen, F.V., Lauritzen, S. L., and Olesen, K.G., "Bayesian Updating in Casual Probabilistic Networks by Local Computations," in Computational Statistics Quarterly, 4:269–282, (1990).*

Henrion, M., Pradhan, M., delFavero, B., Huang, K., Provan, G., and O'Rorke, P., "Why is Diagnosis using Belief Networks Insensitive to Imprecision in Probabilities?", Proceedings of the Twelfth Conference on Uncertainty in Artificial Intelligence, (1996).*

Causal independence for probability assessment and inference using Bayesian networks Heckerman, D.; Breese, J.S.; Systems, Man and Cybernetics, Part A, IEEE Transactions on , vol.: 26, Issue: 6 , Nov. 1996 pp.:826–831.*

Probabilistic relevance relations Geiger, D.; Heckerman, D. Systems, Man and Cybernetics, Part A, IEEE Transactions on vol.: 28 , Issue: 1 , Jan. 1998 pp.:17–25.*

Decision–theoretic case–based reasoning Breese, J.S.; Heckerman, D.; Systems, Man and Cybernetics, Part A, IEEE Transactions on ,vol.: 26 , Issue: 6 , Nov. 1996 pp.:838–842.* de Kleer, J. and Williams, B., "Diagnosing multiple faults" in *Artificial Intelligence*, 32:97–130 (1987).

Heckerman, D. Breese, J., and Rommelse, K., "Decision–theoretic Troubleshooting," in *Communications of the ACM*, 38:49–57 (1995).

Lauritzen, S.L., and Spiegelhalter, D.J., "Local Computations with Probabilites on Graphical Structures and their Applications to Expert Systems," in *Journal of the Royal Statistical Society, Series B*, 50(2): 157–224 (1988).

Jensen, F.V., Lauritzen, S.L., and Olesen, K.G., "Bayesian Updating in Causal Probabilistic Networks by Local Computations," in *Computational Statistics Quarterly*, 4:269–282, (1990).

Breese, J.S. and Heckerman, D. "Decision–theoretic Troubleshooting: A Framework for Repair and Experiment", *Technical Report MSR–TR–96–06*, Microsoft Research, Advanced Technology Division, Microsoft Corporation, Redmond, USA (1996).

Henrion, M., Pradhan, M., del Favero, B., Huang, K., Provan, G., and O'Rorke, P., "Why is Diagnosis using Belief Networks Insensitive to Imprecision in Probabilities?", *Proceedings of the Twelfth Conference on Uncertainty in Artificial Intelligence*, (1996).

* cited by examiner

VALIDATION OF PROBABILISTIC TROUBLESHOOTERS AND DIAGNOSTIC SYSTEM

The subject matter of the present patent application is related to the subject matter set out by Claus Skaanning, Finn V. Jensen, Uffe Kjaerulff, Paul A. Pelletier, Lasse Rostrup Jensen, Marilyn A. Parker and Janice L. Bogorad in patent application Ser. No. 09/353,727, filed on Jul. 14, 1999 for AUTOMATED DIAGNOSIS OF PRINTER SYSTEMS USING BAYESIAN NETWORKS, now issued as U.S. Pat. No. 6,535,865 B1, and to the subject matter set out by Claus Skaanning in patent application Ser. No. 09/388,891, filed on Sep. 2, 1999 for AUTHORING TOOL FOR BAYESIAN NETWORK TROUBLESHOOTERS.

BACKGROUND

The present invention pertains to support of products and pertains particularly to validation of probabilistic troubleshooters and diagnostic systems.

Currently, it is highly expensive for manufacturers to diagnose the systems of their customers. Automation of this process has been attempted using probabilistic troubleshooters and other diagnostic systems. Some of these systems are based on Bayesian networks.

One troubleshooter based on Bayesian networks is described by Heckerman, D., Breese, J., and Rommelse, K. (1995), Decision-theoretic Troubleshooting, *Communications of the ACM*, 38:49–57 (herein "Heckerman et al. 1995").

In scientific literature Bayesian networks are referred to by various names: Bayes nets, causal probabilistic networks, Bayesian belief networks or simply belief networks. Loosely defined Bayesian networks are a concise (acyclic) graphical structure for modeling probabilistic relationships among discrete random variables. Bayesian networks are used to efficiently model problem domains containing uncertainty in some manner and therein lies their utility. Since they can be easily modeled on a computer, they are the subject of increasing interest and use in automated decision-support systems, whether for medical diagnosis, automated automotive troubleshooting, economic or stock market forecasting or in other areas as mundane as predicting a computer user's likely requirements.

In general, a Bayesian network consists of a set of nodes representing discrete-valued variables connected by arcs representing the causal dependencies between the nodes. A set of conditional probability tables, one for each node, defines the dependency between the nodes and its parents. And, nodes without parents, sometimes called source nodes, have associated therewith a prior marginal probability table. For specific applications the data for the probability tables for all other nodes are provided by what is termed domain experts in whatever field is being modeled. This involves assigning prior probabilities for all nodes without parents, and conditional probabilities for all nodes with parents. In diagnostic Bayesian networks nodes can represent causes, or outcomes of actions and questions. In very large diagnostic Bayesian networks, most of the events are very rare with probabilities in the range of 0.001 to 0.000001. But, since a primary goal of a computer decision support system is to provide decisions as accurate as is possible, it is imperative that the domain experts provide probabilistic information that is highly reliable and their best estimate of the situation.

Bayesian networks provide a way to model problem areas using probability theory. The Bayesian network representation of a problem can be used to provide information on a subset of variables given information on others. A Bayesian network consists of a set of variables (nodes) and a set of directed edges (connections between variables). Each variable has a set of mutually exclusive states. The variables together with the directed edges form a directed acyclic graph (DAG). For each variable v with parents $w_1, \ldots, w_n$, there is defined a conditional probability table $P(v|w_1, \ldots, w_n)$. Obviously, if v has no parents, this table reduces to the marginal probability $P(v)$.

Bayesian networks have been used in many application domains with uncertainty, such as medical diagnosis, pedigree analysis, planning, debt detection, bottleneck detection, etc. However, one of the major application areas has been diagnosis. Diagnosis (i.e., underlying factors that cause diseases/malfunctions that again cause symptoms) lends itself nicely to the modeling techniques of Bayesian networks.

In the prior art, validation of probabilistic troubleshooters and diagnostic systems has been highly unstructured and time-consuming. Basically, a domain expert tests a new system by experimenting. The domain expert would try out different sequences with the system by answering suggested steps in different ways. The domain expert tracks coverage of the possible cases. This is very difficult because generally there are thousands of possible cases. The result is the domain expert's validation either covers only a very small part of the possible cases, or in order to cover a larger number of cases, validation is extremely time-consuming.

Currently no software testing programs exist for validation of probabilistic troubleshooters and diagnostic systems. The technique used by software testing programs to test functional software (known as an application) is as follows. In a recording phase, an application is monitored and all interactions and responses are saved into "cases". After an application is possibly modified, the cases are tested during a testing phase. In the testing phase the interactions are regenerated on the new (possibly modified) application, and the responses are compared to the recorded responses in the case. If there is a deviation, the case is labeled a failure. If the response is identical on the entire case, the case is labeled a success. Software testing programs generally also record statistics on successes, failures, and allow a user to trace failures. Some software testers also can generate random interactions with the application (so the testing program generates the interactions).

SUMMARY OF THE INVENTION

In accordance with a preferred embodiment of the present invention, a probabilistic diagnostic system is validated. A diagnostic sequence is generated from a diagnostic model. The diagnostic sequence is evaluated to determine whether the diagnostic sequence provides an acceptable resolution to a problem. This is repeated for additional diagnostic sequences from the diagnostic model. It is determined whether at least a predetermined number of diagnostic sequences provide an acceptable resolution. When it is determined that a the predetermined number of diagnostic sequences provide an acceptable resolution, the diagnostic model is accepted.

In the preferred embodiment, when it is determined that not at least the predetermined number of diagnostic sequences provide an acceptable resolution, a new diagnostic model is generated. Diagnostic sequences previously evaluated for the diagnostic model are checked to see whether these diagnostic sequences provide acceptable resolutions in the new diagnostic model. When it is determined that not at least the predetermined number of diagnostic sequences provide an acceptable resolution, a new diagnostic model is generated. For diagnostic sequences previously evaluated for the diagnostic model, a check is made to see whether these diagnostic sequences provide acceptable resolutions in the new diagnostic model. When it is determined that the diagnostic sequences provide acceptable resolutions in the new diagnostic model, additional diagnostic sequences are tested to determine whether, for the new diagnostic model, at least the predetermined number of diagnostic sequences provide an acceptable resolution. When it is determined that the diagnostic sequences already checked do not provide acceptable resolutions in the new diagnostic model a new revised diagnostic model is generated.

In the preferred embodiment, a case generator comprising a first diagnostic engine and a second diagnostic engine are used to generate the diagnostic sequences. The second diagnostic engine selects a cause. The first diagnostic engine suggests a best next step. The first diagnostic engine does not know the cause selected by the second diagnostic engine. the second diagnostic engine selects an answer to the best next step. The answer is consistent with the cause previously selected. This is repeated until the problem is resolved or until the first diagnostic engine is unable to suggest a best next step.

The second diagnostic engine selects each cause using a random s process. Alternatively, cases can be generated by traversing all possible sequences and selecting those that fulfills one of the three criteria: length of diagnostic sequence, cost of performing diagnostic sequence, and diagnostic sequences that failed to solve the problem. A history module can be used to ensure constant improvement of models by allowing updated models to be compared with earlier accepted sequences.

Alternatively, the case generator can be implemented using a single diagnostic engine.

Various statistics can be displayed by the case generator and/or by a case evaluator that performs the evaluation of the diagnostic system. The results of the testing can be stored in a history module. The history module stores a library of diagnostic sequences. Information about each diagnostic sequence includes which model versions were tested with the diagnostic sequence and any results of testing performed with the diagnostic sequence.

In one preferred embodiment of the present invention, the probabilistic diagnostic system is based on Bayesian networks.

The preferred embodiment of the present invention allows for the validation of the ability of probabilistic troubleshooters and other diagnostic systems to generate a sequence of questions or tests. The preferred embodiment of the present invention allows for validation of the ability of such a system to reach a conclusion about the likelihood of an underlying problem, diagnosis, or cause, based on the responses to the sequence of questions or tests.

Specifically, cases (diagnostic sequences) that reflect the system's model of the probabilistic relationships among problems, questions, and possible answers are validated. Also validated is the ability to test diagnostic accuracy using such cases, and the ability to quickly measure the effects of making changes to the underlying model using previously recorded cases.

DESCRIPTION OF THE PREFERRED EMBODIMENT

The present invention is useful for efficient validation of probabilistic troubleshooters and other diagnostic systems such as those based on Bayesian networks. For example, the invention is useful for any model or system that can do the following: (1) generate the probability of one or more problems (also known as diagnoses or causes); (2) generate the next question or test; and (3) generate the probability of each possible answer of that next question or test, given the information known to the system.

While the present invention applies to any model or system that can perform the above listed functions, below a Bayesian network troubleshooter is used as a particular embodiment to illustrate operation of the invention.

For example, an efficient process for gathering the information necessary to construct troubleshooters based on Bayesian networks, methods for representation of this information in a Bayesian network, and methods for determining optimal sequences of troubleshooting steps in such troubleshooters is described by Claus Skaanning, Finn V. Jensen, Uffe Kjaerulff, Paul A. Pelletier, Lasse Rostrup Jensen, Marilyn A. Parker and Janice L. Bogorad in patent application Ser. No. 09/353,727, filed on Jul. 14, 1999 for AUTOMATED DIAGNOSIS OF PRINTER SYSTEMS USING BAYESIAN NETWORKS, now issued as U.S. Pat. No. 6,535,865 B1, (herein "the AUTOMATED DIAGNOSIS patent"), the subject matter of which is herein incorporated by reference.

An authoring tool that efficiently supports the knowledge acquisition process for troubleshooters based on Bayesian networks is described by Claus Skaanning in patent application Ser. No. 09/388,891, filed on Sep. 2, 1999 for AUTHORING TOOL FOR BAYESIAN NETWORK TROUBLESHOOTERS (herein "the AUTHORING TOOL patent application"), the subject matter of which is herein incorporated by reference.

In the description below, the diagnostic model is a Bayesian network representing causes, actions and questions. This Bayesian network has a very simple structure—one parent node representing the causes, having nodes representing actions and questions as children. Arcs are directed from the parent node towards the children, giving us what is also called a naive Bayes network because of the simplicity of the structure. The parent node contains a prior probability distribution over the causes. The causes are mutually exclusive since they are represented as states of this node. For actions and questions, we have conditional probability distributions over their answers conditional on the causes. The AUTOMATED DIAGNOSIS patent and the AUTHORING TOOL patent application describe methods for getting these probabilities from domain experts, and methods for computing good sequences of steps based on this representation.

In general, diagnostic models do not have be Bayesian networks but can be anything, e.g., case based systems, fuzzy systems, rule based systems, etc. They would need some representation of the system under scrutiny—possibly organized differently than with causes, actions and questions.

Validation of troubleshooters based on Bayesian networks poses a potential bottleneck. To alleviate this bottleneck the preferred embodiment of the present invention allows generation of a number of diagnostic sequences fulfilling various criteria from the troubleshooters. These diagnostic sequences can then be evaluated. If a sufficient number of these diagnostic sequences are approved, the model can be said to have an acceptable quality. If too few diagnostic sequences are approved, the model must be revised, and the process starts over.

Herein, a sequence of steps corresponding with a troubleshooting session is referred to as one case, or one diagnostic sequence. Troubleshooting models are often referred to as just a model.

The preferred embodiment of the present invention validates the ability of probabilistic troubleshooters and other diagnostic systems to generate a diagnostic sequence of questions or tests, and the ability of such a system to reach a conclusion about the likelihood of an underlying problem, diagnosis, or cause, based on the responses to the diagnostic sequence of is questions or tests.

This is done by generating diagnostic sequences that reflect the model used by the diagnostic system to define the probabilistic relationships among problems, questions, and possible answers. Diagnostic accuracy is tested using the diagnostic sequences. The effects of making changes to the underlying model are then measured using previously recorded diagnostic sequences.

In the preferred embodiment, diagnostic sequences are generated in two ways. First, random diagnostic sequences are generated from probabilities in the model such that a representative set of diagnostic sequences can be guaranteed to be generated. Second, special diagnostic sequences are generated fulfilling various criteria. These criteria are, for example, the N longest diagnostic sequences (highest number of steps), the N most costly diagnostic sequences (total sum of cost of all steps in the sequence), and the N failing diagnostic sequences (where the problem is not solved).

For a Bayesian network based troubleshooter constructed in accordance with the AUTOMATED DIAGNOSIS patent, three types of information are represented: (1) causes of a problem, (2) actions that can solve the problem, or test something, and (3) questions that provide information about the causes. Probabilities of the causes, probabilities of actions solving causes, probabilities of question answers, probabilities of causes conditional on questions, and probabilities of questions conditional on causes are all represented within Bayesian networks. These probabilities are utilized on computations generating an optimal sequence of troubleshooting steps for the guidance of a user that is experiencing a problem with a device. These probabilities can also be utilized in generating random sequences guaranteeing a certain coverage of the possible diagnostic sequences.

Figure 1:
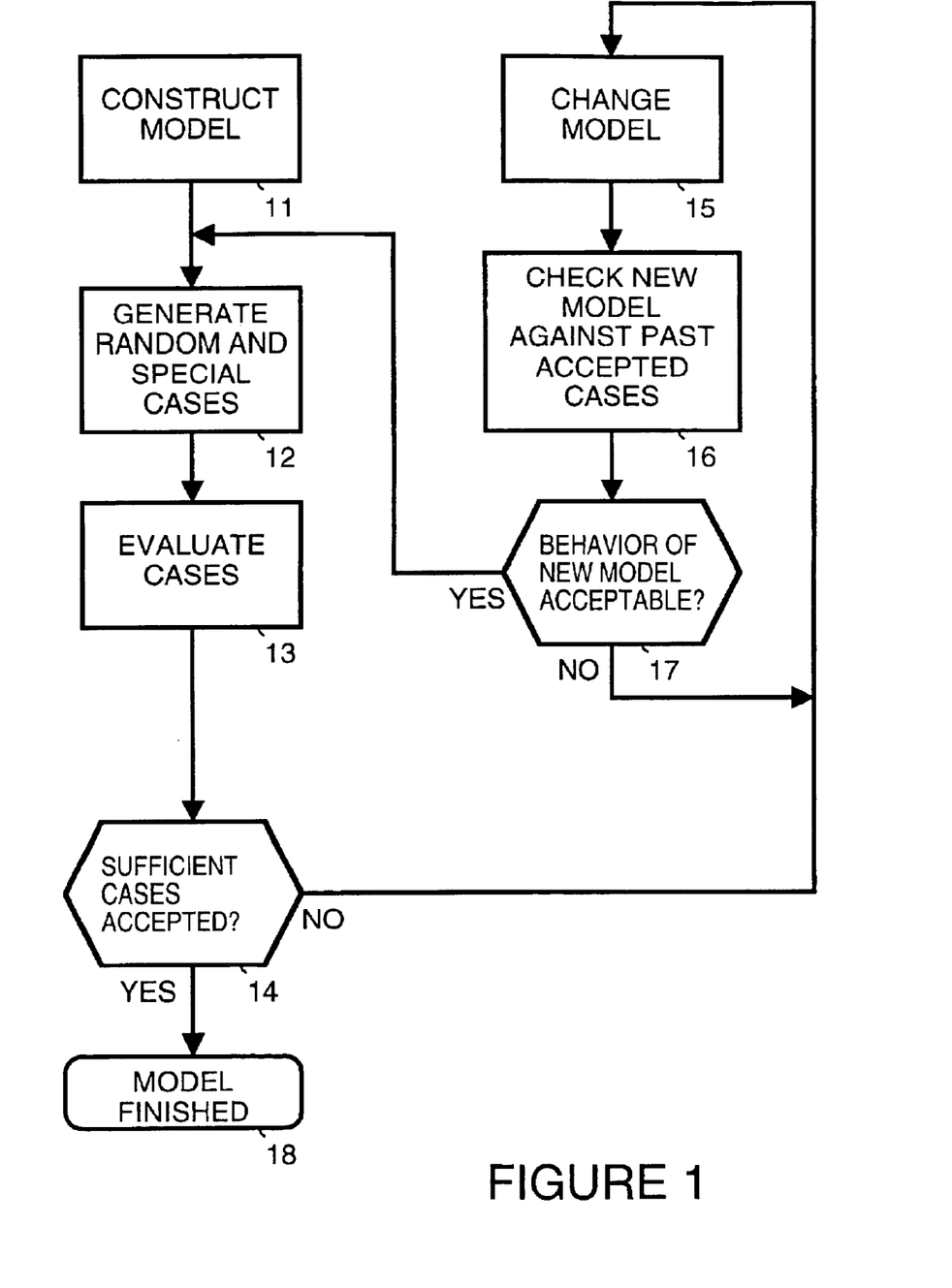
FIG. 1 shows the flow of validation of a Bayesian network troubleshooter in accordance with a preferred embodiment of the present invention.

In FIG. 1, one possible flow of a validation process is described. In a step 11 a model is constructed. This is done, for example, using the authoring tool described in the AUTHORING TOOL patent application. Alternatively, any probabilistic model that needs to be validated is constructed using any available authoring tool.

In a step 12, a number of random and special diagnostic sequences are generated using a case generator. This process is more fully described below.

In a step 13, the diagnostic sequences are evaluated using a case evaluator. Using the case evaluator, a number of the diagnostic sequences are accepted, and the remaining diagnostic sequences are not.

In a step 14, a decision is made as to whether a sufficient number of diagnostic sequences have been accepted to ensure sufficient quality of the model. If a sufficient number of diagnostic sequences are accepted, in a step 18, the model is terminated.

If, in step 14, it is determined that there were not a sufficient number of diagnostic sequences accepted, in a step 15, the model is revised taking into account the diagnostic sequences not accepted. The changed model may now solve some of the prior problems, however, the changed model may also create new problems. Thus, in a step 16, the changed model is checked by simulating the new model with respect to past accepted diagnostic sequences. The checking is done to assure that under the changed model the past accepted diagnostic sequences will still be accepted.

In a step 17, a decision is made as to whether the changed model performs satisfactorily as regards the past accepted diagnostic sequences. If not, step 15 is repeated. If the changed model performs satisfactorily, in step 12, the validation process is repeated to determine whether the changed model now performs acceptably.

Further description of modules which accomplish the functionality described in FIG. 1 is set out below. Particularly, the case generator described below generates random and special diagnostic sequences. The case evaluator described below evaluates the random and special diagnostic sequences generated by the case generator. The history check module described below compares a changed model against past accepted diagnostic sequences.

Figure 2:
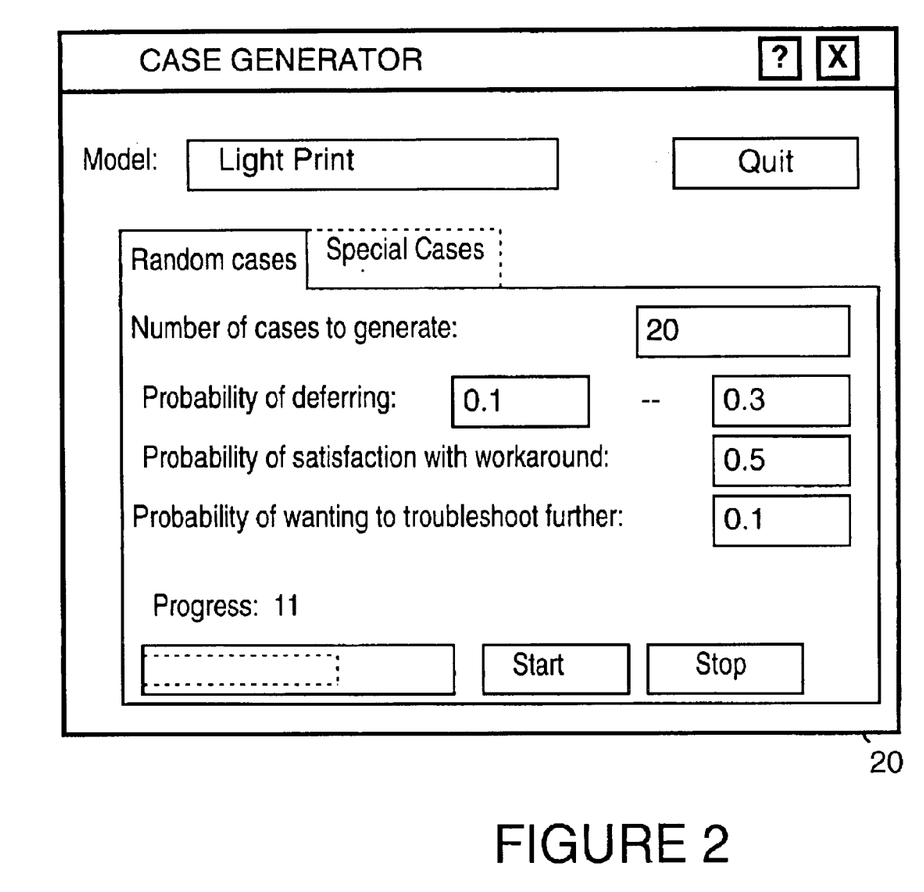
FIG. 2 shows a window interface for a case generator in accordance with a preferred embodiment of the present invention.

FIG. 2 shows a window interface 20 for a case generator. The case generator generates diagnostic sequences randomly or for a specific problem of interest. In order to generate a diagnostic sequence, the case generator determines the underlying problem of the diagnostic sequence. For random diagnostic sequence generation, the probability with which a specific underlying problem is chosen may be determined by selecting that problem with the probability assigned to it in the diagnostic engine. Such a probability may be based on baseline information (the prior probability) or based in addition on information specified by the user.

Once the underlying problem has been selected, the case generator generates a sequence of steps (diagnostic questions or tests). Each step is generated based on the ability of the diagnostic engine to select the next step.

Window interface 20 is utilized by a specialized case generator that operates on Bayesian networks. This case generator allows the generation of a number of random or special diagnostic sequences. Window interface 20 is displaying an interface based on selection of a tab for generating random diagnostic sequences.

In window interface 20, the model being validated is "Light print". Light print is an error condition that occurs on printers when the output is too light. As shown in FIG. 2, the case generator is set to generate twenty diagnostic sequences (cases). In the model for light print various probabilities are specified. Default values for probabilities are provided that are known from experience to be generally useful. Window interface 20 allows a user to adjust the probability of deferring, the probability of satisfaction with workaround and the probability of wanting to troubleshoot further even though the problem has been solved.

The probabilities of deferring a step can be set to be in a range of two probabilities, such that the low value is used for the least costly steps, and the high value is used for the most costly steps. This is useful for simulating users' assumed behavior of being more likely to defer more costly steps.

Window interface 20 includes a start button which a user selects to start the generation of diagnostic sequences. A stop button can be used by the user to stop the generation of diagnostic sequences. A progress bar allows monitoring the progress of the diagnostic sequence generation. In FIG. 2, 11 out of the 20 diagnostic sequences have been generated.

Figure 3:
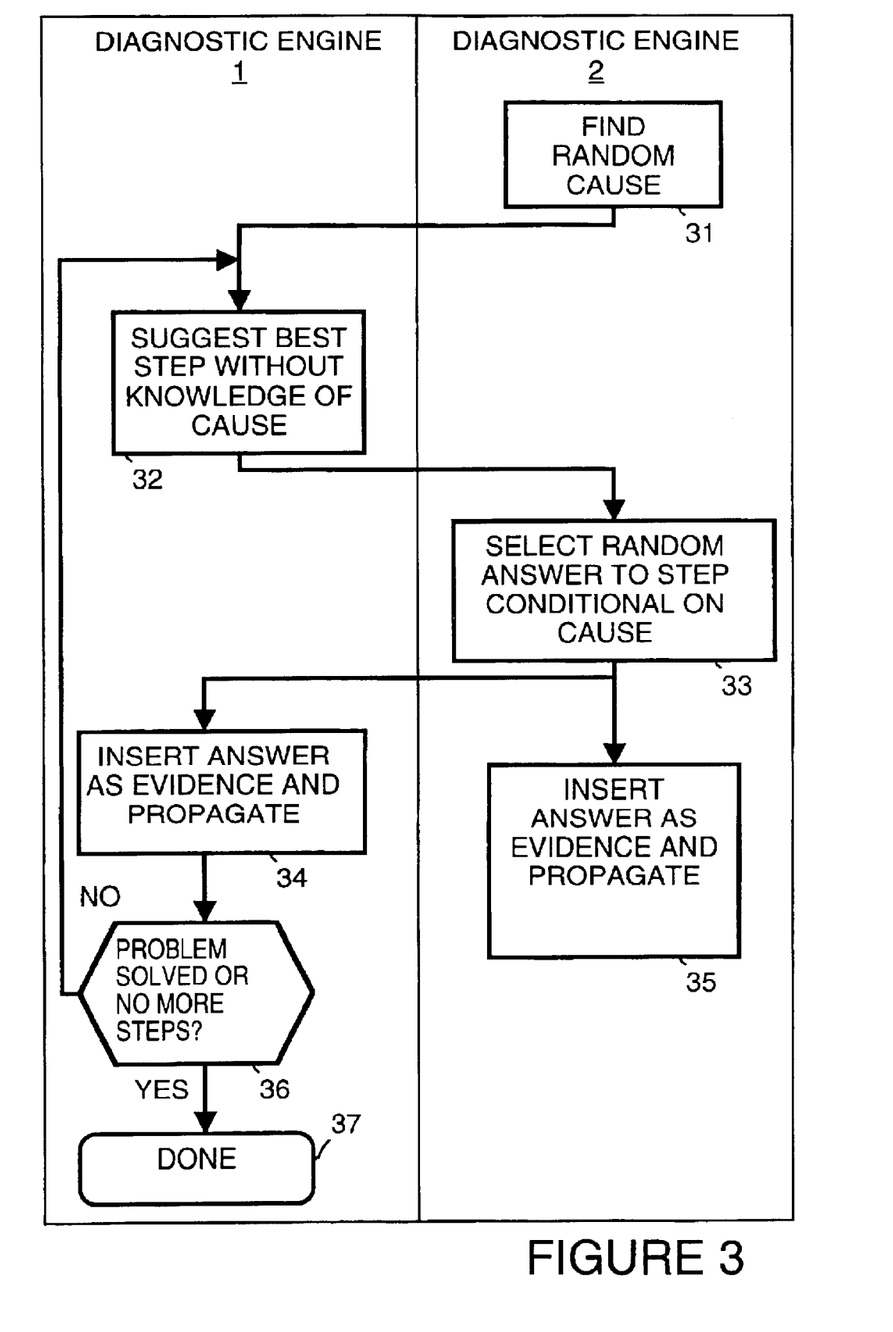
FIG. 3 shows the flow of simulating random cases utilizing two diagnostic engines in accordance with a preferred embodiment of the present invention.

As illustrated by FIG. 3, the diagnostic sequences are generated using two diagnostic engines. A diagnostic engine is the computational core of the troubleshooter that computes the optimal sequence of steps. A diagnostic engine 1 is used to generate the sequence of troubleshooting steps without knowledge of the true cause. A diagnostic engine 2 is used to simulate the answers to the troubleshooting steps suggested by diagnostic engine 1, conditional on the true cause.

The two diagnostic engines work in tandem. Diagnostic engine 1 forms the "tested" engine in which the underlying problem is unknown. Diagnostic engine 2 forms the "simulator" engine which simulates the underlying problem and generates answers to the steps generated by the diagnostic engine 1. These answers are based on their likelihood given the underlying problem and also based on the answers to previous steps.

FIG. 3 also illustrates the process followed to generate a sequence of random steps based on the probabilities of the model. In a left side of FIG. 3, the process of diagnostic engine 1 is shown. The process of diagnostic engine 2 is shown in the right side. The flow of control is illustrated with arrows.

In a step 31, diagnostic engine 2 determines a random cause. The cause is picked from the prior probability distribution over the causes. This cause is assumed to be the true cause in this case. It is inserted as evidence in diagnostic engine 2 but not in diagnostic engine 1. Diagnostic engine 1 has to operate without the knowledge of the true cause, and attempt to determine it and solve the problem in an efficient manner.

After the true cause has been determined, in step 32, diagnostic engine 1 is used to determine the best next troubleshooting step without knowing the true cause.

In a step 33, diagnostic engine 2 is used to determine a random answer to this step. This answer is picked from the probability distribution over the step's answers conditional on the true cause and answers to other steps. This is very important, as otherwise diagnostic engine 2 could potentially suggest answers not consistent with the true cause, leading to inconsistent sequences.

In a step 34 the answer is inserted as evidence in diagnostic engine 1 and a propagation is performed in diagnostic engine 1 to update probability distributions conditional on the new evidence. Likewise, in a step 35 the answer is inserted as evidence in diagnostic engine 2 and a propagation is performed in diagnostic engine 2 to update probability distributions conditional on the new evidence.

In a step 36, diagnostic engine 1 checks whether the problem is solved. For example, the problem is solved when a user answers "yes" in response to a question after an instruction such as: "Perform this action. Did it solve the problem?". If the problem is solved or if there are no more steps to suggest, in a step 37, the sequence is finished. If the problem is not solved and there are more steps to suggest, diagnostic engine 1 repeats step 32 and suggests another troubleshooting step attempting to solve the problem.

When diagnostic sequences are generated using the sequence shown in FIG. 3, this essentially corresponds to the general statistical situation with an experiment with a number of observations N, F of which are failures. Statistical methods can then be used to determine confidence intervals for the experiment such that with confidence C, the probability of failure does not exceed p. The outcome of the experiment (here—the evaluation of a diagnostic sequence) can be represented by a binomial distribution with probability p of failure. Given N observations with F failures, we want to determine probability p' such that with confidence C, p±p'. Technically this is done by integrating over the binomial distribution using numerical methods.

Instead of finding a random cause as in step 31, a more advanced procedure for determining a random cause can be used.

For example, assuming a prior probability of each diagnostic model matching the error condition the user is experiencing, the case generator could start out by selecting a random model, and then selecting a random cause within this model.

Assuming a prior probability of each diagnostic model matching the error condition the user is experiencing, and causes that occur in multiple models, the case generator could start out by using the total prior probability of the causes in the entire population of models to select a random cause.

Assuming a "supermodel" is used to identify the correct diagnostic model matching the error condition that the user is experiencing by asking questions to the user, the case generator could simulate a random sequence through the "supermodel" reaching a random model. In this model, a random cause could then be selected, and the case generator could proceed as usual.

Figure 4:
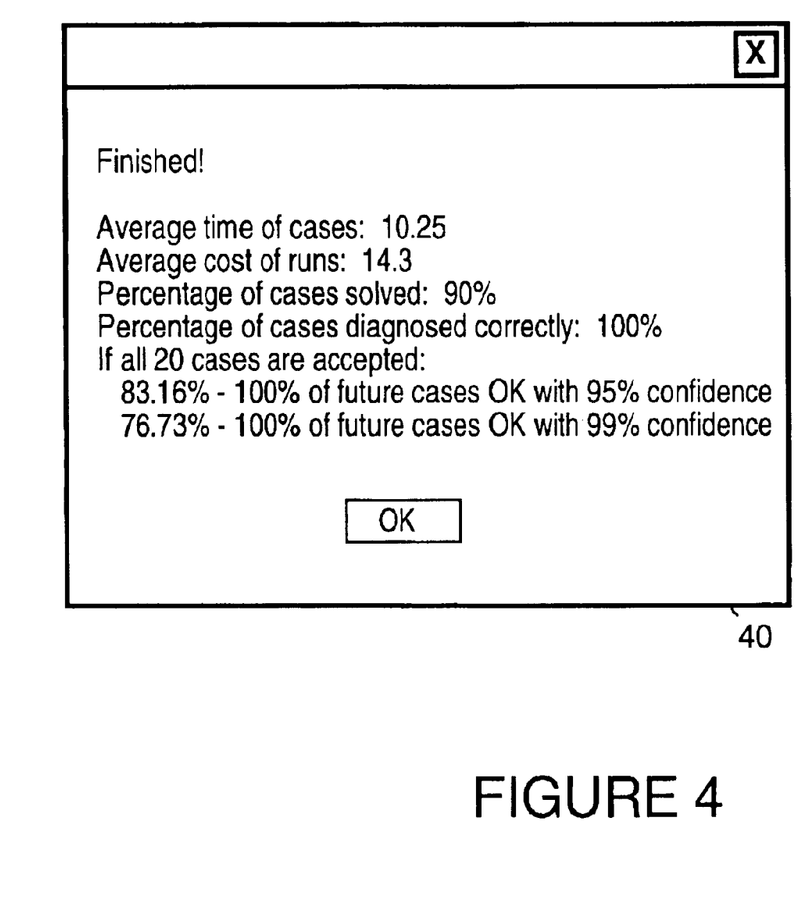
FIG. 4 shows a window interface that provides statistics over generated cases in accordance with a preferred embodiment of the present invention.

As illustrated by the contents of window 40 shown in FIG. 4, the case generator calculates some statistics that are computed after the generation of diagnostic sequences. The average total time of cases is the sum of the time of all steps in the sequence that were not deferred. The average total cost of cases is the sum of the cost of all steps in the diagnostic sequence that were not deferred. When the percentage of cases in which the problem was solved is low, this is not necessarily problematic, as the model may contain causes that cannot be resolved by the user but requires additional assistance. The percentage of cases in which the correct diagnosis was found should be as close to 100% as possible. If it does not reach 100% it may be because of errors in the model, or because of generated random diagnostic sequences where many steps were deferred. When many steps are deferred, it may be hard for even a high quality troubleshooter to resolve the problem. The confidence intervals are calculated under the assumption that all generated diagnostic sequences are accepted. Confidence intervals for 95% and 99% are shown. These confidence intervals can help users to decide how many diagnostic sequences they need to look at before an acceptable level of quality is guaranteed.

Figure 5:
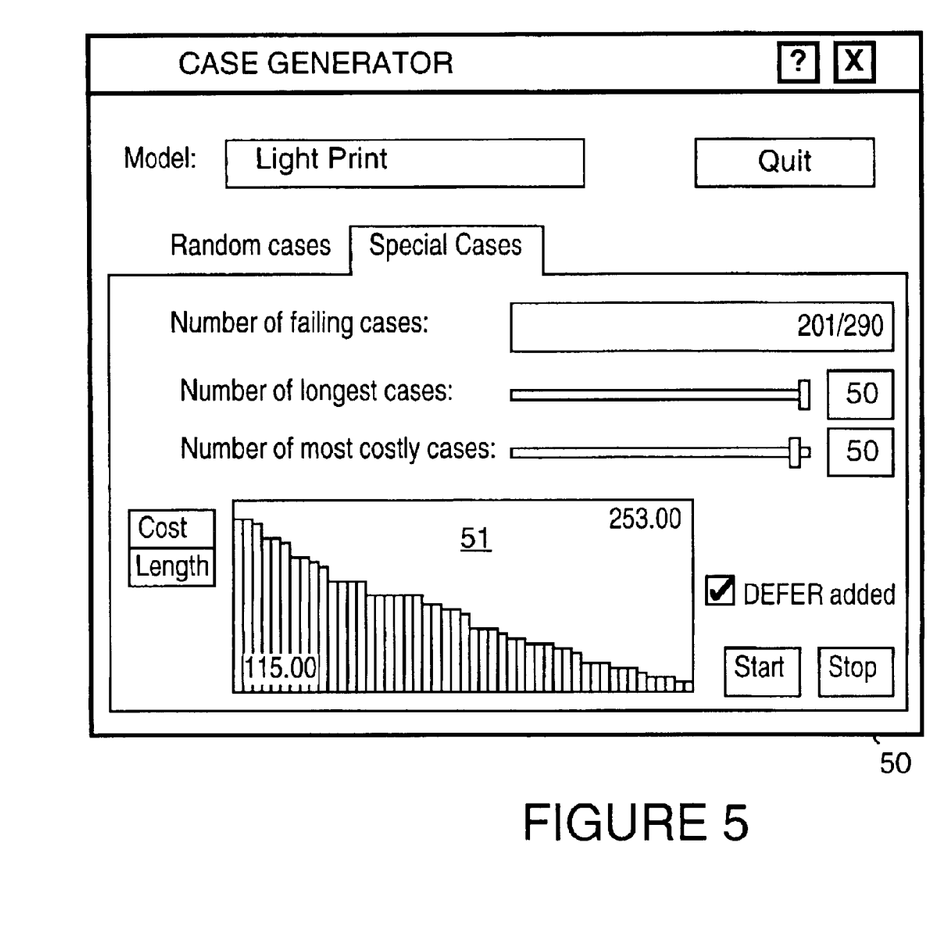
FIG. 5 shows a window interface for a special case generator in accordance with a preferred embodiment of the present invention.

As illustrated by window interface 50 shown in FIG. 5, special diagnostic sequences can also be generated in a different manner than the random methods previously described. For example, special diagnostic sequences may be generated with a complete traversal of the possible sequences.

In the preferred embodiment of the present invention, the case generator include both a random case generator and a special case generator. The special case generator can generate special cases fulfilling the three criteria: very long diagnostic sequences, very costly diagnostic sequences and failing diagnostic sequences. The special case generator is shown. The special case generator works quite differently from the random case generator. The special case generator basically traverses all possible sequences of the troubleshooter model and fetches the longest, most costly, and failing diagnostic sequences from these.

Window interface 50 for the special case generator allows the user to specify how many of the longest diagnostic sequences should be stored, and how many of the most costly diagnostic sequences should be stored. Window interface 50 also allows the user to specify whether deferring steps should be allowed or not. If deferring is allowed, the number of possible sequences grows exponentially, often making it intractable to generate them all. Histogram 51 depicts the distribution of total cost of the stored costly diagnostic sequences, or the distribution of length of the stored longest diagnostic sequences.

The complete troubleshooting tree is traversed with an algorithm working as set out in Table 1 below. At all times, all previous steps in the sequence and the answers that have been tried are remembered.

TABLE 1

1) Select best next step, S
   a) Assign AS to the empty set
2) If all answers of S have been tried:
   a) If there is no step prior to S, stop
   b) Assign S to the previous step, S*
   c) Jump back to 2)
3) Try next answer A for step S
   a) Insert A into AS
4) If problem is solved, or there are no more steps to suggest:
   a) Save this complete sequence
   b) Assign S to the previous step, S*
   c) Jump back to 2)
5) Jump back to 1)

Once a number of special and random diagnostic sequences have been generated, the diagnostic sequences are evaluated by the case evaluator.

Figure 6:
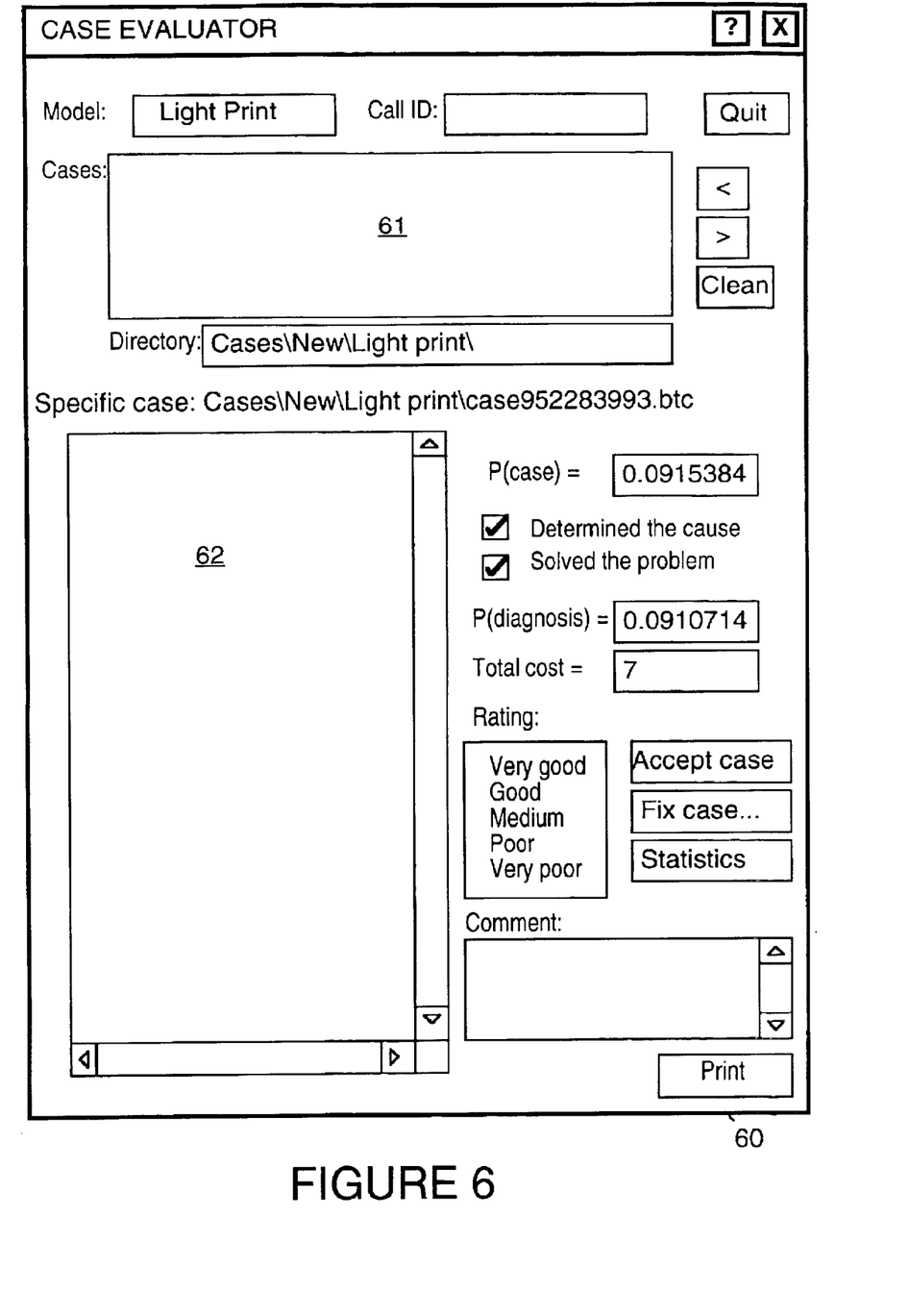
FIG. 6 shows a window interface for a special case generator where a particular case is viewed in accordance with a preferred embodiment of the present invention.

FIG. 6 shows a window interface 60 for the case evaluator. The case evaluator provides an intuitive overview of the generated diagnostic sequences. The example values shown in window interface 60 are for random diagnostic sequences generated for the "Light print" model. A window 61 provides a listing of all the generated diagnostic sequences. For example, Table 2 below gives sample diagnostic sequences that could be listed in window 61.

TABLE 2

| case952283990.btc | case952283997.btc | case952284004.btc |
| case952283991.btc | case952283998.btc | case952284005.btc |
| case952283992.btc | case952283999.btc | case952284006.btc |
| case952283993.btc | case952284000.btc | case952284007.btc |

TABLE 2-continued

| case952283994.btc | case952284001.btc | case952284008.btc |
| case952283995.btc | case952284002.btc | case952284009.btc |
| case952283996.btc | case952284003.btc | [ . . . ] |

To the right of window 61 there are buttons for traversing the generated diagnostic sequences, and cleaning the directory of diagnostic sequences.

A window 62 provides a textual overview of the generated diagnostic sequence with all relevant information. For example, window 62 contains the items set out in Table 3 below:

TABLE 3 the name of the error condition, "Light print"
the filename of the model
the name of assumed true cause, in this case "Toner distribution problem"
the prior marginal probability of this cause
the sequence of steps. For each step:
   the name of the step
   the simulated answer to the step
   the probability of this answer conditional on the cause
   the type of the step: action or question
   the cost of the step
   the cumulative time of the sequence
the information provided to the user at the end of the troubleshooting session
the diagnosis of the troubleshooter. The diagnosis should preferably be equal to the assumed cause
the final probability of the diagnosis conditional on all the answers to the steps of the session An example of text displayed in window 62 is set out in Table 4 below:

TABLE 4

Problem. Light print
Filename D:\program files\BATS\nets\Ij5si\light print.hkb
Cause: Toner distribution problem (e.g, low)
Cause probability: 0.152564
Call Agent: No
   Step sequence:
      1. Ensure that economode is not on in the printer driver
         ---No Probability: 1
      Type: SolutionAction    Cost 1 Cumul. time 1
      2. Is the printer configuration page printed light?
         ---Yes Probability: 1
      Type: Question          Cost 4 Cumul. time 5
      3. Remove, shake and reinsert toner cartridge
         --Yes Probability 0.6
      Type: SolutionAction    Cost 2 Cumul. time 7
   Information: The most likely cause was 'Toner distribution problem (e.g., low)' with a probability: 0.910714
Thanks for using the HP BATS Troubleshooter
Diagnosis Toner distribution problem (e.g., low)
Diagnosis probability 0.910714

The sequence outlined in Table 4 is a successful case since it has a short length (only three steps), low total cost (7 minutes), and actually solves the problem. The cause initially selected was "Toner distribution problems" indicating that the toner cartridge is running out of ink. Even though this cause has a low prior probability (0.15), the sequence finds a solution to the problem in only three steps and ends up with a high degree of certainty about the correct cause (0.91).

In first step, a setting in the printer driver is checked. In a second step, a test is performed to see whether the printer configuration page is printed light. If this is the case, we can be certain that the underlying cause is within the printer hardware—if this is not the case, we can be certain that the underlying cause occurs prior to the print job reaching the printer, i.e., most likely within the printer software on the PC. Given the information that the printer configuration page is indeed printed light, toner distribution problem becomes the most likely cause, and is immediately examined, resulting in a successful resolution to the problem.

Next to window 62, further information is provided to allow for quick evaluation. The P(case) value is the probability of the diagnostic sequence found as the probability of the cause multiplied by the product of the probabilities of the answers to the steps in the sequence. A check box indicates whether the cause was determined. Another check box indicates whether the problem was solved. A P(diagnosis value) is the final probability of the diagnosis. A total cost is the total cost of the sequence.

When all this information has been reviewed and it has been determined how the troubleshooter performed, a rating can be given to the diagnostic sequence and the diagnostic sequence can be either accepted or marked for further examination. If the diagnostic sequence is accepted it is moved from the directory of new diagnostic sequences to the directory of accepted diagnostic sequences.

If the diagnostic sequence is not accepted, a comment explaining the defect is provided in the "Comment" box such that the model constructor can perform the necessary changes. If the person performing the validation is the same as the person constructing the model, this may not be necessary.

The button labeled "Statistics" allows access to a window that calculates confidence intervals given N diagnostic sequences out of which F was not accepted.

Figure 7:
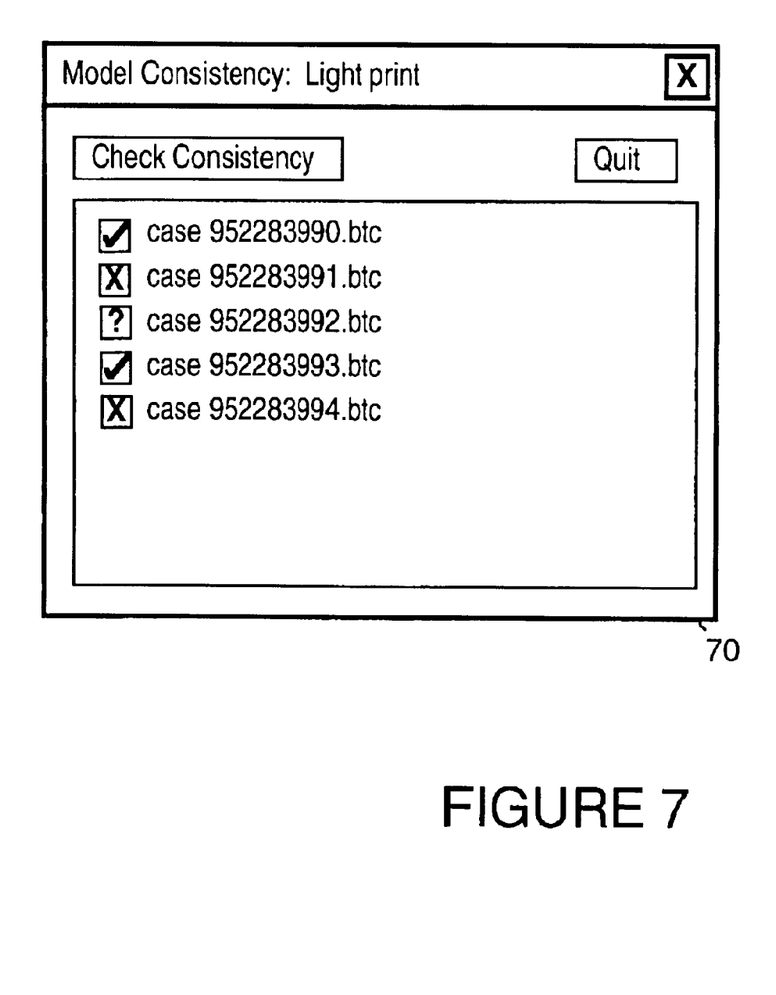
FIG. 7 shows a window interface for a history check module in accordance with a preferred embodiment of the present invention.

FIG. 7 shows a window interface 70 for a history module. The history module gives the validation system the ability to generate a library of diagnostic sequences (cases). This is done by testing on a version of a model for a number of random and special sequences and determining whether the model performs acceptably or not. Based on the result, the diagnostic sequence is stored in a library of positive or negative diagnostic sequences. When the model is revised to some alternative version, both the positive and negative diagnostic sequences are tested. The goal of the method is to identify negative diagnostic sequences that get "fixed" by the revision of the model, as well as positive diagnostic sequences that get "messed up" by the revision of the model. The changed diagnostic sequences can be highlighted to facilitate the user of the diagnostic system determining why the diagnostic sequences were changed.

The history module ensures constant improvement when revising models by comparing the models against past accepted diagnostic sequences. The history module allows checking all past accepted diagnostic sequences to see whether the revised model performs similarly. The mark in front of each listed diagnostic sequence represents the status of the diagnostic sequence. A question mark means that the diagnostic sequence has not been checked yet. A check mark means that the diagnostic sequence has been checked and the revised model performed similar to the old version of the model. An "X" means that the diagnostic sequence has been checked and the revised model did not perform similar to the old version of the model. A plus means that the diagnostic sequence has been checked and the revised model performed better than the old version If a diagnostic sequence marked "X" is selected, another window opens up illustrating the differences between the diagnostic sequence as performed with the revised and the old version of the model.

The behavior of a past accepted diagnostic sequence is simulated in the revised model by running two diagnostic engines side by side similar as illustrated in FIG. 3. The only difference between this situation and the general situation discussed using FIG. 3 is that in this diagnostic sequence the answers are not selected randomly. The answers are given by the past accepted diagnostic sequence. Only if a step that was not present in the past accepted diagnostic sequence is suggested by the revised model, is an answer selected randomly.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for validating a probabilistic diagnostic system comprising the following steps:
    (a) generating a diagnostic sequence from a diagnostic model;
    (b) evaluating the diagnostic sequence to determine whether the diagnostic sequence provides an acceptable resolution to a problem;
    (c) repeating steps (a) and (b) for additional diagnostic sequences from the diagnostic model;
    (d) determining whether at least a predetermined number of diagnostic sequences provide an acceptable resolution; and,
    (e) accepting the diagnostic model when in step (d) it is determined that at least the predetermined number of diagnostic sequences provide an acceptable resolution.

2. A method as in claim 1 wherein when in step (d) it is determined that not at least the predetermined number of diagnostic sequences provide an acceptable resolution, performing the following additional step:
    (f) generating a new diagnostic model.

3. A method as in claim 1 wherein when in step (d) it is determined that not at least the predetermined number of diagnostic sequences provide an acceptable resolution, performing the following additional steps:
    (f) generating a new diagnostic model; and,
    (g) for diagnostic sequences previously evaluated for the diagnostic model, checking to see whether these diagnostic sequences provide acceptable resolutions in the new diagnostic model.

4. A method as in claim 1 wherein when in step (d) it is determined that not at least the predetermined number of diagnostic sequences provide an acceptable resolution, performing the following additional steps:
    (f) generating a new diagnostic model;
    (g) for diagnostic sequences previously evaluated for the diagnostic model, checking to see whether these diagnostic sequences provide acceptable resolutions in the new diagnostic model; and,
    (h) when in step (g) it is determined that the diagnostic sequences provide acceptable resolutions in the new diagnostic model, repeating steps (a) through (e) for the new diagnostic model.

5. A method as in claim 1 wherein when in step (d) it is determined that not at least the predetermined number of diagnostic sequences provide an acceptable resolution, performing the following additional steps:
(f) generating a new diagnostic model;
(g) for diagnostic sequences previously evaluated for the diagnostic model, checking to see whether these diagnostic sequences provide acceptable resolutions in the new diagnostic model;
(h) when in step (g) it is determined that the diagnostic sequences provide acceptable resolutions in the new diagnostic model, repeating steps (a) through (e) for the new diagnostic model; and,
(i) when in step (g) it is determined that the diagnostic sequences do not all provide acceptable resolutions in the new diagnostic model, repeating steps (a) through (h) for a new revised diagnostic model.

6. A method as in claim 1 wherein the following step is performed before step (a):
constructing the diagnostic model.

7. A method as in claim 1 wherein when in step (d) it is determined that not at least the predetermined number of diagnostic sequences provide an acceptable resolution, performing the following additional steps:
(f) generating a new diagnostic model; and,
(g) for diagnostic sequences that provided an acceptable resolution for the diagnostic model, checking to see whether these diagnostic sequences provide acceptable resolutions in the new diagnostic model.

8. A method as in claim 1 wherein when in step (d) it is determined that not at least the predetermined number of diagnostic sequences provide an acceptable resolution, performing the following additional steps:
(f) generating a new diagnostic model; and,
(g) for diagnostic sequences that did not provide an acceptable resolution for the diagnostic model, checking to see whether these diagnostic sequences provide acceptable resolutions in the new diagnostic model.

9. A method as in claim 1 wherein step (a) includes the following substeps performed by a first diagnostic engine and a second diagnostic engine:
(a.1) selecting a cause by the second diagnostic engine;
(a.2) suggesting a best next step by the first diagnostic engine, the first diagnostic engine not knowing the cause selected by the second diagnostic engine;
(a.3) selecting an answer to the best next step by the second diagnostic engine, the answer being consistent with the cause selected in substep (b.1); and,
(a.4) repeating substeps (a.1) to (a.3) until the problem is resolved or until the first diagnostic engine is unable to suggest a best next step.

10. A method as in claim 9 wherein in substep (a.1) the cause is selected using a random process.

11. A method as in claim 1 wherein step (a) includes the following substeps performed by a diagnostic engine:
(a.1) selecting a cause by the diagnostic engine;
(a.2) selecting a best next step by the diagnostic engine while temporarily withholding knowledge of the selected cause;
(a.3) selecting an answer to the best next step by the diagnostic engine, the answer being consistent with the cause selected in substep (a.1); and,
(a.4) repeating substeps (a.1) to (a.3) until the problem is resolved or until the diagnostic engine is unable to suggest a best next step.

12. A method as in claim 11 wherein in substep (a.1) the cause is selected using a random process.

13. A method as in claim 1 wherein in step (a) includes traversing sequences and selecting a specified number of sequences according to specific criterion.

14. A method as in claim 13 wherein the specific criterion is longest sequences.

15. A method as in claim 13 wherein the specific criterion is most costly sequences.

16. A method as in claim 13 wherein the specific criterion is failing sequences.

17. A method as in claim 1 wherein in step (a) includes producing a number of sequences, a specified number of which that fulfill a specific criterion being selected for further validation.

18. A method as in claim 17 wherein the specific criterion is longest sequences.

19. A method as in claim 17 wherein the sequences produced are random sequences.

20. A method as in claim 17 wherein the specific criterion is most costly sequences.

21. A method as in claim 17 wherein the specific criterion is failing sequences.

22. A method as in claim 1 wherein in step (d) the predetermined number is user selectable.

23. A method as in claim 1 wherein the probabilistic diagnostic system is based on Bayesian networks.

24. A method as in claim 1 further comprising the following steps:
(f) displaying statistics about the diagnostic model resulting from performance of step (a).

25. A method as in claim 1 further comprising the following steps:
(f) displaying statistics about the diagnostic model resulting from performance of step (b).

26. A method as in claim 1 wherein step (a) includes selecting a random diagnostic model, and then selecting a random cause within the random diagnostic model.

27. A method as in claim 1 wherein step (a) includes using a total prior probability of causes in an entire population of diagnostic models to select a random cause.

28. A method as in claim 1 wherein step (a) includes simulating a random sequence to select a random cause.

29. A system for validating a probabilistic diagnostic system, the system comprising:
a case generator that generates diagnostic sequences from a diagnostic model; and,
a case evaluator that allows a user to evaluate the diagnostic sequences generated by the case generator to determine whether each diagnostic sequence provides an acceptable resolution to a problem, the case evaluator determining whether at least a predetermined number of diagnostic sequences provide an acceptable resolution and accepting the diagnostic model when it is determined that at least the predetermined number of diagnostic sequences provide an acceptable resolution.

30. A system as in claim 29 wherein the case generator comprises:
a first diagnostic engine; and,
a second diagnostic engine;
wherein when generating a diagnostic sequence the following is repeated until the problem is resolved or until the first diagnostic engine is unable to suggest a best next step:
the second diagnostic engine selects a cause,
the first diagnostic engine suggests a best next step, the first diagnostic engine not knowing the cause selected by the second diagnostic engine, and the second diagnostic engine selects an answer to the best next step by the second diagnostic engine, the answer being consistent with the cause selected by the first diagnostic engine.

31. A system as in claim 29 wherein the case generator comprises:

a diagnostic engine;

wherein when generating a diagnostic sequence the following is repeated until the problem is resolved or until the diagnostic engine is unable to suggest a best next step:

the diagnostic engine selects a cause, the diagnostic engine suggests a best next step while temporarily withholding knowledge of the selected cause, and the diagnostic engine selects an answer to the best next step, the answer being consistent with the cause selected by the diagnostic engine.

32. A system as in claim 29 wherein case generator selects causes using a random process.

33. A system as in claim 29 wherein the case generator traverses sequences and selects a specified number of sequences according to specific criterion.

34. A system as in claim 33 wherein the specific criterion is one of the following:

longest sequences;

most costly sequences; and, failing sequences.

35. A system as in claim 29 wherein the case generator displays statistics about the generated diagnostic sequences.

36. A system as in claim 29 wherein the case evaluator displays statistics after performing an evaluation.

37. A system as in claim 29 additionally comprising:

a history module that stores a library of diagnostic sequences, information about each diagnostic sequence including the following:

which model versions were tested with the diagnostic sequence;

any results of testing performed with the diagnostic sequence.

38. A system as in claim 36 wherein the history module is used to check whether past accepted and failed cases work in an updated diagnostic model.

* * * * *